Figure 1:
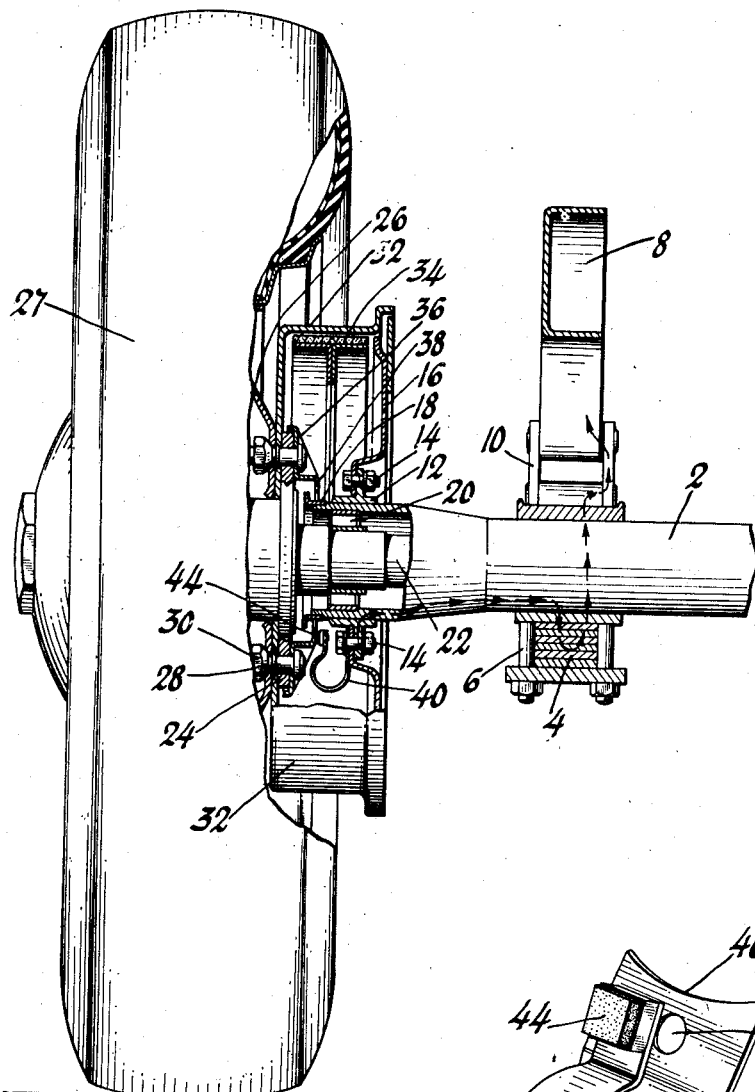

Feb. 15, 1938.                R. C. ELLIS ET AL                2,108,530
                          RADIO STATIC ELIMINATOR
                            Filed July 5, 1935

Inventors
Ray C. Ellis and
Samuel W. Archer

By Blackmor, Spencer & Flint
                    Attorneys

Patented Feb. 15, 1938

2,108,530

UNITED STATES PATENT OFFICE 2,108,530

RADIO STATIC ELIMINATOR

Ray C. Ellis and Samuel W. Archer, Detroit, Mich., assignors to General Motors Corporation, Detroit, Mich., a corporation of Delaware Application July 5, 1935, Serial No. 29,954

3 Claims. (Cl. 175—264)

This invention relates to means to collect and dissipate the charge of static electricity that is built up upon the tires and wheels used on automotive vehicles.

It is of course well known that there are sources whereby static electricity is generated in the normal operation of a motor car and that these static charges cause considerable and annoying disturbance in the operation of radio receiving sets that are installed in the cars. With the more widespread use of radio sets in cars, investigations were conducted with a view to locate the source of this static interference so that the same could be eliminated. This investigation disclosed the fact that the static seemed to be more pronounced in dry, clear weather than in wet weather when it practically disappeared. Further investigation brought out the fact that a static charge was found on the wheel and tire and of course in wet, moist weather this charge would not be able to build up but would leak off without any attendant spark. But in dry weather the charge would build up on the wheel until it reached a sufficient potential to jump to ground and each of these discharges would of course make a sound in the radio set. The source of this static charge may be due to several effects. It may come from the friction between the road surface and the tire which seems to be the majority view. It may be due to the flexing of the tire layers themselves upon rotation or it may be due to the air friction on the tire as it rotates and of course it may be a combination of all these. However, it has been proved that a static charge does exist on the tire and wheel. If this charge is allowed to remain it will build up and discharge to the ground causing a spark and a click in the radio. The charge is existent on the tire, rim, spokes and hub. The central portion or hub is secured to a rotatable shaft or axle which is carried in bearings and has at its other end driving mechanism. There is an oil film present between the shaft and the bearing surfaces and in the driving mechanism so that the wheel and shaft are electrically insulated by these oil films from the car frame and the static charges cannot leak off but build up and cause interference in the radio set. In order to avoid a building up of these static charges on the wheel and tire, it is necessary to provide some means whereby they may leak off gradually therefrom to the frame and prevent the attainment of a sufficiently high potential to cause a spark.

It is therefore an object of my invention to provide means for dissipating tire static.

It is a further object to provide means for conducting the static charge from the wheel to the frame for grounding the same.

It is a still further object to provide a device easily applied to present structure to accomplish the above.

Figure 2:
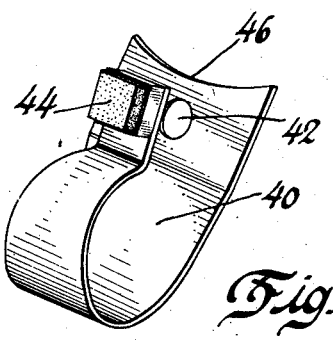

For a better understanding of the nature and objects of the invention, reference is made to the following specification wherein there are described the embodiments of our invention which are illustrated in the accompanying drawing, in which:

Fig. 1 is a vertical elevation of a wheel and its connection to the chassis, parts being broken away and shown in section, and Fig. 2 is an enlarged perspective view of the spring and contact of our invention.

A tubular axle housing 2 has clamped thereto a semi-elliptic spring 4 by U-bolts 6. The ends of the spring are connected to the frame 8 through shackles 10. The outer end of the housing 2 is enlarged and has a collar 12 rigidly secured thereto to which is secured by bolts 14 a circular plate 16 for enclosing one side of the braking mechanism. Secured to the outer periphery of the housing and extending beyond the end thereof is an outwardly flanged circular ring member 18 which acts as part of an oil seal. Secured within the enlarged end portion is a roller bearing assembly 20 through which passes the axle shaft 22 and by which it is supported.

The outer end of the shaft is formed of a flat flanged plate 24 to which the wheel 26, carrying tire 27, is secured by bolts 28 and nuts 30. A brake drum 32 is also secured to the axle by the bolts 28 and forms an enclosure within which the brake shoes 34 are located. Secured to the inside face of the flanged plate 24 by the heads of the bolts 28 is a circular flanged member 36 whose inner rim 38 extends radially of the axle and is inwardly spaced from the ring 18, the two forming a tortuous passage from the interior of the hollow housing 2 to the interior of the brake drum to act as baffles to prevent the flow of grease and oil from the housing to the brake drum which flow would allow grease to congregate on the braking surfaces and prevent proper braking action.

Beneath the head of one of the bolts 14 is secured one end of a U-shaped spring member 40 which passes through a hole 42 therein. The upper edge of the member 40 is arcuate in shape, as at 46, to conform to the outer surface of the collar 12 so that the spring will not rotate about the bolt when in assembled relation. The free end of the spring member carries a contact 44 of suitable material thereon, which is adapted to bear against the surface of the rim 38 to complete an electric circuit therethrough. This member 44 will of course have a wiping contact on the rim 38 and be in contact therewith throughout the rotation of the rim with the wheel.

It will be evident that any charge which is generated on the tire and wheel will be conducted to the plate 24 since it is in direct metallic contact therewith. From there it will flow to the member 36 which is flat against the plate. It will then flow from the rim 38 of the member 36 into the contact 44, through the spring 40 and collar 12, to the housing 2, where it may then flow to the frame by a path, shown by arrows in Fig. 1, and be grounded or dissipated. In this way no charge can be built up of sufficient size to cause a spark or radio interference since it is dissipated as fast as it is generated to the frame, which of course, is the common ground for all of the electrical equipment of the car.

We claim:

1. In a vehicle, a frame, an axle housing mounted on the frame, a wheel, an axle secured thereto, means for mounting the axle within the housing for rotation comprising lubricated bearings and means forming an electrical by-pass from the axle to the housing and frame around the bearing, said means comprising a flanged ring member and a cooperating spring member having a contact mounted thereon adapted to be maintained in contact with the ring surface, one of said members being secured to the housing and the other to the axle.

2. In an automotive vehicle, a frame, a hollow housing, spring means connecting the housing to the frame, a wheel, an axle secured thereto, means rotatably supporting the axle within the housing and means secured to the housing and bearing against a portion of the wheel assembly to form an electrical path from the wheel to the frame to allow any generated charges to leak off, said means comprising a flanged ring secured to the axle and a U-shaped spring contact member carried by the housing and adapted to contact the surface of the ring and slide thereover.

3. In a vehicle, a hollow axle housing, an axle rotatably mounted in the housing having a flanged end, a wheel secured to the end, an annular flanged member secured to the end, a spring member secured to the housing and a contact carried thereby which engages the surface of the annular member for wiping contact therewith.

RAY C. ELLIS.
SAMUEL W. ARCHER.